US008624566B2

(12) United States Patent
Sohma

(10) Patent No.: US 8,624,566 B2
(45) Date of Patent: Jan. 7, 2014

(54) CURRENT-MODE CONTROL SWITCHING REGULATOR AND OPERATIONS CONTROL METHOD THEREOF

(75) Inventor: Shohtaroh Sohma, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 12/990,607

(22) PCT Filed: Apr. 7, 2009

(86) PCT No.: PCT/JP2009/057425
§ 371 (c)(1),
(2), (4) Date: Nov. 1, 2010

(87) PCT Pub. No.: WO2009/139249
PCT Pub. Date: Nov. 19, 2009

(65) Prior Publication Data
US 2011/0043175 A1    Feb. 24, 2011

(30) Foreign Application Priority Data
May 13, 2008   (JP) .................................. 2008-125715

(51) Int. Cl.
*G05F 1/56*     (2006.01)
(52) U.S. Cl.
USPC .............................. 323/222; 323/283; 323/299
(58) Field of Classification Search
USPC ........................... 323/222, 282–288, 299, 280
See application file for complete search history.

(56) References Cited

U.S. PATENT DOCUMENTS

| 4,975,820 | A   |   | 12/1990 | Szepesi |   |
|---|---|---|---|---|---|
| 5,600,234 | A | * | 2/1997 | Hastings et al. | 323/282 |
| 6,069,807 | A |   | 5/2000 | Boylan et al. |   |
| 6,137,182 | A | * | 10/2000 | Hause et al. | 257/774 |
| 6,522,116 | B1 | * | 2/2003 | Jordan | 323/288 |
| 6,750,637 | B2 |   | 6/2004 | Nagaki et al. |   |
| 6,781,356 | B1 | * | 8/2004 | Yang et al. | 323/282 |
| 7,649,346 | B2 |   | 1/2010 | Sohma |   |
| 7,679,348 | B2 |   | 3/2010 | Sohma |   |
| 8,334,682 | B2 | * | 12/2012 | Chiu et al. | 323/282 |
| 2006/0284607 | A1 |   | 12/2006 | Isobe |   |
| 2007/0217698 | A1 |   | 9/2007 | Son |   |
| 2007/0247131 | A1 |   | 10/2007 | Sohma |   |
| 2007/0285073 | A1 |   | 12/2007 | Nishida |   |

(Continued)

FOREIGN PATENT DOCUMENTS

| JP | 3-178551 | 8/1991 |
|---|---|---|
| JP | 2001-112250 | 4/2001 |

(Continued)

OTHER PUBLICATIONS

International Search Report and Written Opinion in PCT/JP2009/057425.

(Continued)

*Primary Examiner* — Rajnikant Patel
(74) *Attorney, Agent, or Firm* — Cooper & Dunham LLP

(57) ABSTRACT

Disclosed is a current-mode control switching regulator that steps down or steps up an input voltage input to an input terminal to a predetermined constant voltage and outputs the stepped input voltage from an output terminal as an output voltage. The current-mode control switching regulator includes a switching element, an inductor, a rectifying element, an error amplification circuit unit, an oscillation circuit unit with variable oscillation frequency, a slope voltage generation circuit unit, and a switching control circuit unit.

17 Claims, 10 Drawing Sheets

(56) References Cited

U.S. PATENT DOCUMENTS

| | | |
|---|---|---|
| 2008/0080219 A1 | 4/2008 | Sohma |
| 2008/0150508 A1 | 6/2008 | Sohma |
| 2009/0135632 A1 | 5/2009 | Sohma |
| 2010/0013447 A1 | 1/2010 | Furuse et al. |
| 2010/0181977 A1 | 7/2010 | Sohma |

FOREIGN PATENT DOCUMENTS

| | | |
|---|---|---|
| JP | 2004-40856 | 2/2004 |
| JP | 2006-33958 | 2/2006 |
| JP | 2006-246626 | 9/2006 |
| JP | 2007-244128 | 9/2007 |
| JP | 2007-252113 | 9/2007 |
| JP | 2007-259599 | 10/2007 |
| JP | 2008-92635 | 4/2008 |
| JP | 2008-161001 | 7/2008 |
| JP | 2009-33883 | 2/2009 |
| JP | 2009-131062 | 6/2009 |
| JP | 2009-278719 | 11/2009 |
| JP | 2009-278720 | 11/2009 |
| JP | 2010-28951 | 2/2010 |
| WO | WO2009/139249 | 11/2009 |
| WO | WO2009/139430 | 11/2009 |

OTHER PUBLICATIONS

Mar. 30, 2012 Korean official action (and English translation thereof) in connection with a counterpart Korean patent application.

* cited by examiner

CURRENT-MODE CONTROL SWITCHING REGULATOR AND OPERATIONS CONTROL METHOD THEREOF

TECHNICAL FIELD

The present invention relates to a current-mode control switching regulator that operates in a wide input/output voltage range and a wide frequency range.

BACKGROUND ART

In general, voltage-mode control switching regulators have been widely used. The voltage-mode control switching regulators perform PWM control on a switching element in accordance with a voltage difference between an output voltage and a reference voltage, thereby stabilizing the output voltage. However, since the voltage-mode control switching regulators detect a returned signal from the output voltage, their response speed to fluctuation in the output voltage is slow and the phase compensation of an error amplification circuit which amplifies the voltage difference between the output voltage and the reference voltage becomes complicated.

As a technology to solve these deficiencies, current-mode control switching regulators have been used in many cases. However, it is known that, when the on-duty cycle of PWM control exceeds 50%, the current mode control switching regulators cause subharmonic oscillation and go out of control. Therefore, slope compensation is performed on PWM control to prevent subharmonic oscillation.

FIG. 1 is a circuit diagram showing an example of a current-mode control switching regulator having a circuit that performs such slope compensation and shows a step-down switching regulator.

In FIG. 1, when a switching transistor 105 is turned on, power is supplied to an inductor 104, a smoothing capacitor 102, and a load 101. When the switching transistor 105 is turned off, the energies accumulated in the inductor 104 and the smoothing capacitor 102 are supplied to the load 101. A current/voltage conversion circuit 106 has impedance Rsense and outputs a converted voltage Vsense (=Rsense×iL) obtained by converting the voltage of a current iL fed to the inductor 104 with the impedance Rsense.

Furthermore, an oscillation circuit 110 generates and outputs a predetermined reference clock signal CLK and a predetermined sawtooth wave voltage Vramp. An accumulator 108 performs slope compensation by adding the sawtooth wave voltage Vramp to the converted voltage Vsense and outputs the result to the non-inverting input terminal of a PWM comparator 107 as a slope voltage Vs. An error amplification circuit 115 amplifies a voltage difference between a reference voltage Vref and a divided voltage Vfb obtained by dividing an output voltage Vout and outputs a generated error voltage Ve to the inverting input terminal of the PWM comparator 107. The PWM comparator 107 compares the error voltage Ve with the slope voltage Vs. When the error voltage Ve exceeds the slope voltage Vs, the PWM comparator 107 resets an RS latch circuit 112 to turn off the switching transistor 105. Therefore, the peak current value of the inductor current iL depends on the error voltage Ve.

In regulating the output voltage Vout, the PWM comparator 107 reduces the error voltage Ve to reduce the output voltage Vout when the divided voltage Vfb is larger than the reference voltage Vref. Furthermore, the PWM comparator 107 increases the error voltage Ve to increase the output voltage Vout when the divided voltage Vfb is smaller than the reference voltage Vref.

In order to prevent the subharmonic oscillation described above, it is necessary to perform slope compensation so that the inclination of the slope voltage Vs becomes one-half or more of that of the inductor current iL when the switching transistor 105 is turned off.

Specifically, in FIG. 1, assuming that the inductance of the inductor 104 is L, the inclination diL/dt of the inductor current iL when the switching transistor 105 is turned on is obtained by the following formula (a). Furthermore, the inclination diL/dt of the inductor current iL when the switching transistor 105 is turned off is obtained by the following formula (b).

$$diL/dt=(Vin-Vout)/L \qquad (a)$$

$$diL/dt=-Vout/L \qquad (b)$$

When the inclination of the sawtooth wave voltage Vramp is slope compensation Iramp, the slope compensation at this time is obtained by the following formula (c).

$$Iramp>Vout/2/L \times Rsense \qquad (c)$$

Note that in a step-up switching regulator, the formulae (a), (b), and (c) are represented by the following formulae (d), (e), and (f), respectively.

$$diL/dt=Vin/L \qquad (d)$$

$$diL/dt=-(Vout-Vin)/L \qquad (e)$$

$$Iramp>(Vout-Vin)/L/2 \times Rsense \qquad (f)$$

As described above, the slope compensation Iramp can be represented using the variables of the output voltage Vout and the input voltage Vin. When the input voltage Vin and the output voltage Vout are constant values, no problem occurs. However, the input voltage Vin and the output voltage Vout generally fluctuate in a wide range. Therefore, when the slope compensation Iramp is set to a fixed value, the slope compensation Iramp is required to be set to the maximum value within the fluctuation range of the expected input voltage Vin and the output voltage Vout. However, although subharmonic oscillation can be prevented when excessive slope compensation is performed, the advantages of current feedback are lost. As a result, the current-mode control switching regulator operates like the voltage-mode switching regulator to degrade its controllability. In order to deal with this, a slope control amount is determined in accordance with an input/output voltage to properly perform slope compensation in a wide input/output voltage range (see, e.g., Patent Document 1).

Patent Document 1: JP-2006-33958

However, in this case, since the slope compensation amount is changed in accordance with an input voltage and an output voltage, the circuit becomes complicated. Furthermore, since the general-purpose IC of the switching regulator generally has an external resistor for generating the divided voltage obtained by dividing an output voltage and cannot monitor the output voltage, it cannot perform slope compensation in accordance with the output voltage.

On the other hand, the inductance L selected by a designer is changed as the operating frequency of the switching regulator changes. Therefore, when the slope compensation Iramp is set to a fixed value, it is required to be set to the maximum value within the fluctuation range of the expected input voltage Vin, the output voltage Vout, and the inductance L. For example, when the oscillation frequencies of the oscillation circuit are 2 MHz, 1 MHz, 500 kHz, and 300 kHz, the selected inductances L are 2.2 μH, 4.7 μH, 10 μH, and 15 μH, respectively, which are inversely proportional to the oscillation frequencies. However, as described above, although subharmonic oscillation can be prevented when excessive slope compensation is performed, the advantages of current feedback are lost. As a result, the current-mode control switching regulator operates like the voltage-mode switching regulator to degrade its controllability. However, the known switching regulator cannot perform the slope compensation in accordance with the inductance L.

DISCLOSURE OF INVENTION

The present invention has been made to solve the above problems and may provide a current-mode control switching regulator capable of preventing subharmonic oscillation in a wide input/output voltage range and a wide variable frequency range with a simple circuit and suppressing fluctuation in frequency characteristics. Specifically, a step-down switching regulator changes the inclination of a slope voltage in accordance with an input voltage and an oscillation frequency, while a step-up switching regulator changes the inclination of a slope voltage in accordance with an output voltage and an oscillation frequency. The present invention may also provide the operations control method of the current-mode control switching regulator.

According to a first aspect of the present invention, there is provided a current-mode control switching regulator that steps down an input voltage input to an input terminal to a predetermined constant voltage and outputs the stepped input voltage from an output terminal as an output voltage. The current-mode control switching regulator includes a switching element that performs a switching operation in accordance with an input control signal; an inductor that is charged with the input voltage by the switching operation of the switching element; a rectifying element that discharges the inductor; an error amplification circuit unit that amplifies a voltage difference between a divided voltage obtained by dividing the output voltage at a predetermined ratio and a predetermined reference voltage; an oscillation circuit unit with variable oscillation frequency that generates and outputs a clock signal having a set oscillation frequency; a slope voltage generation circuit unit that generates and outputs a slope voltage having an inclination corresponding to the input voltage and the oscillation frequency; and a switching control circuit unit that compares an output voltage from the error amplification circuit unit with the slope voltage, generates a pulse signal of a duty cycle corresponding to a comparison result using the clock signal, and performs switching control on the switching element in accordance with the pulse signal.

According to a second aspect of the present invention, there is provided a current-mode control switching regulator that steps up an input voltage input to an input terminal to a predetermined constant voltage and outputs the stepped input voltage from an output terminal as an output voltage. The current-mode control switching regulator includes a switching element that performs a switching operation in accordance with an input control signal; an inductor that is charged with the input voltage by the switching operation of the switching element; a rectifying element that discharges the inductor; an error amplification circuit unit that amplifies a voltage difference between a divided voltage obtained by dividing the output voltage at a predetermined ratio and a predetermined reference voltage; an oscillation circuit unit with variable oscillation frequency that generates and outputs a clock signal having a set oscillation frequency; a slope voltage generation circuit unit that generates and outputs a slope voltage having an inclination corresponding to the output voltage and the oscillation frequency; and a switching control circuit unit that compares an output voltage from the error amplification circuit unit with the slope voltage, generates a pulse signal of a duty cycle corresponding to a comparison result using the clock signal, and performs switching control on the switching element in accordance with the pulse signal.

According to a third aspect of the present invention, there is provided an operations control method of a current-mode control switching regulator having a switching element that performs a switching operation in accordance with an input control signal; an inductor that is charged with an input voltage input to an input terminal by the switching operation of the switching element; a rectifying element that discharges the inductor; and an oscillation circuit unit with variable oscillation frequency that generates and outputs a clock signal having a set oscillation frequency, the current-mode control switching regulator performing switching control on the switching element in accordance with a pulse signal generated using the clock signal so that an output voltage from an output terminal becomes a predetermined constant voltage and stepping down the input voltage input to the input terminal to a predetermined constant voltage and outputting the stepped input voltage from the output terminal as the output voltage. The operations control method includes varying an inclination of a slope voltage used for generating the pulse signal to perform the switching control on the switching element in accordance with the input voltage and the oscillation frequency.

According to a fourth aspect of the present invention, there is provided an operations control method of a current-mode control switching regulator having a switching element that performs a switching operation in accordance with an input control signal; an inductor that is charged with an input voltage input to an input terminal by the switching operation of the switching element; a rectifying element that discharges the inductor; and an oscillation circuit unit with variable oscillation frequency that generates and outputs a clock signal having a set oscillation frequency, the current-mode control switching regulator performing switching control on the switching element in accordance with a pulse signal generated using the clock signal so that an output voltage from an output terminal becomes a predetermined constant voltage and stepping up the input voltage input to the input terminal to a predetermined constant voltage and outputting the stepped input voltage from the output terminal as the output voltage. The operations control method includes varying an inclination of a slope voltage used for generating the pulse signal to perform the switching control on the switching element in accordance with the output voltage and the oscillation frequency.

BEST MODE FOR CARRYING OUT THE INVENTION

Next, referring to the accompanying drawings, a description is made of embodiments of the present invention.

First Embodiment

Figure 1:
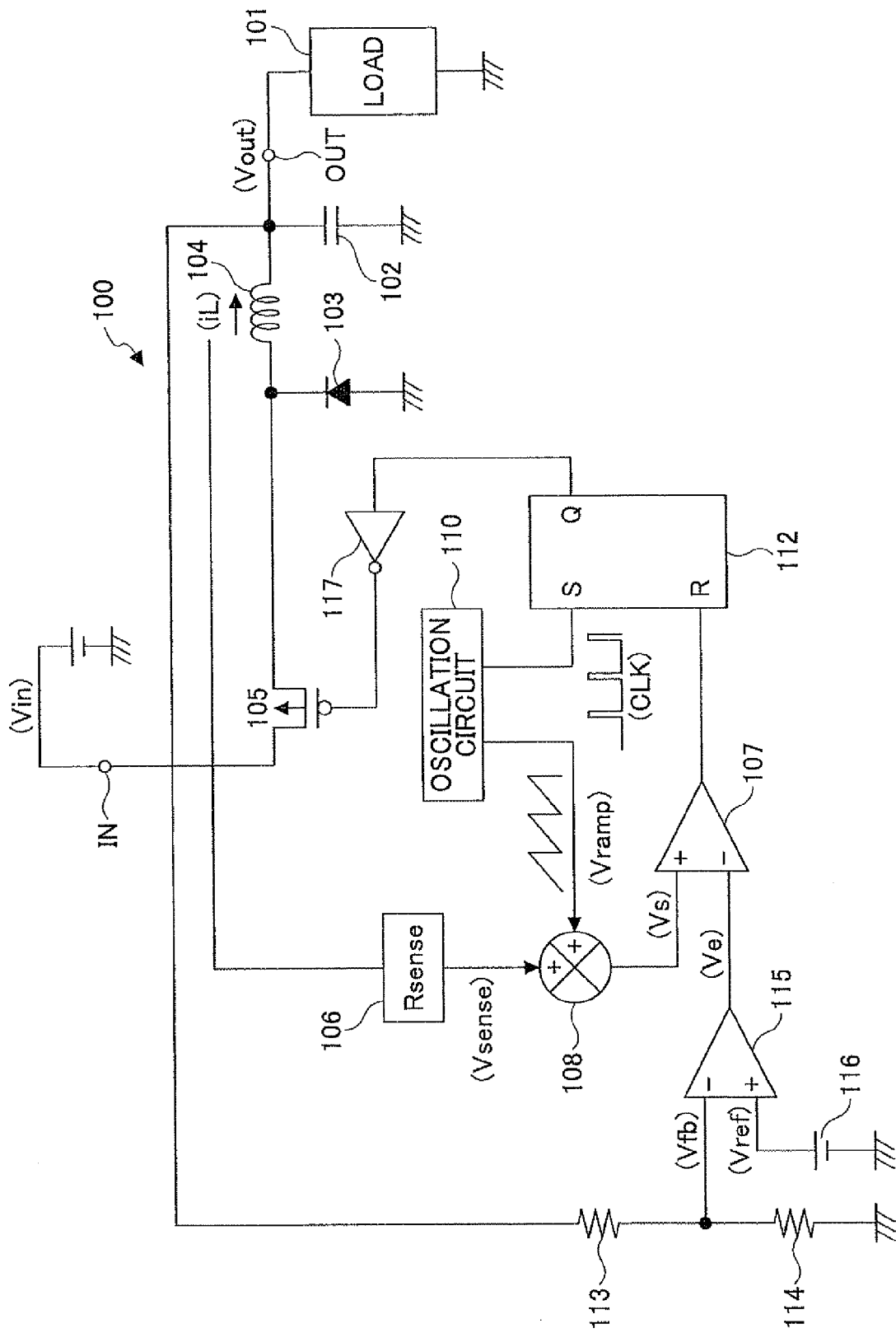
FIG. 1 is a circuit diagram showing a circuit example of a current-mode control switching regulator.
Figure 2:
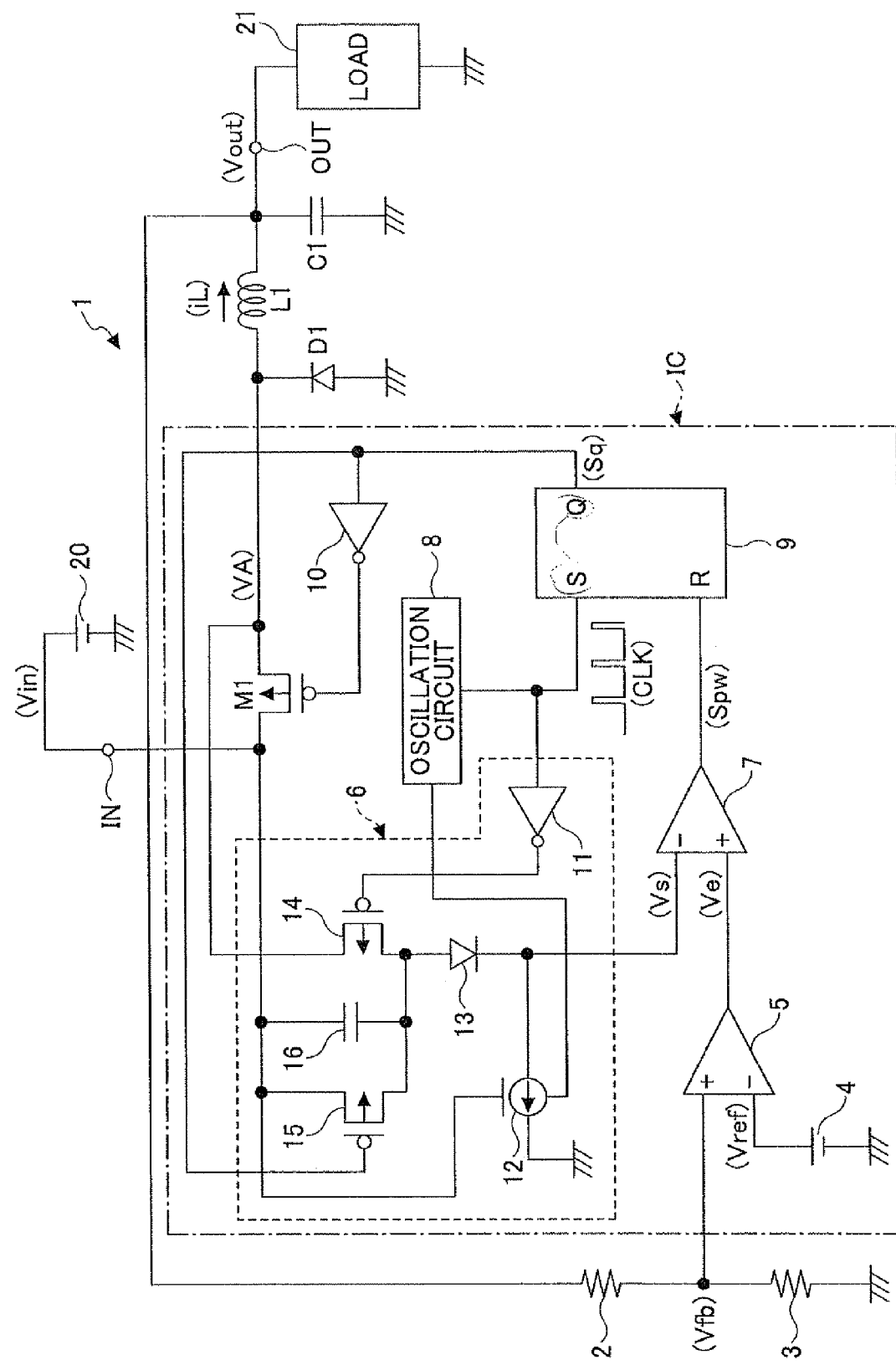
FIG. 2 is a circuit diagram showing a circuit example of a current-mode control switching regulator according to a first embodiment of the present invention.

FIG. 2 is a circuit diagram showing a circuit example of a current-mode control switching regulator according to a first embodiment of the present invention.

The current-mode control switching regulator (hereinafter referred to as a switching regulator) 1 shown in FIG. 2 constitutes a step-down switching regulator that steps down an input voltage Vin input from a DC power supply 20 to an input terminal IN to a predetermined constant voltage and outputs the stepped input voltage from an output terminal OUT to a load 21 as an output voltage Vout.

The switching regulator 1 has a switching transistor M1 that is composed of a PMOS transistor for controlling the output of a current from the input terminal IN; a rectifying diode D1; an inductor L1; a smoothing capacitor C1; and output voltage detecting resistors 2 and 3 that divide the output voltage Vout and generate and output a divided voltage Vfb. In addition, the switching regulator 1 has a reference voltage generation circuit 4 that generates and outputs a predetermined reference voltage Vref; an error amplification circuit 5 that compares the divided voltage Vfb with the reference voltage Vref, amplifies a voltage difference between the divided voltage Vfb and the reference voltage Vref, and generates and outputs an error voltage Ve; and a slope voltage generation circuit 6 that generates and outputs a slope voltage Vs.

Moreover, the switching regulator 1 has a PWM comparator 7, an oscillation circuit 8 with variable oscillation frequency, an RS flip-flop circuit 9, and an inverter 10. The PWM comparator 7 compares the error voltage Ve from the error amplification circuit 5 with the slope voltage Vs and generates and outputs a pulse signal Spw for performing PWM control having a pulse width corresponding to the error voltage Ve. The oscillation circuit 8 with variable oscillation frequency generates and outputs the clock signal CLK having a set oscillation frequency Fosc. The RS flip-flop circuit 9 has a set input terminal S to which the clock signal CLK from the oscillation circuit 8 is input and a reset input terminal R to which the pulse signal Spw from the PWM comparator 7 is input. The inverter 10 generates a control signal for performing switching control on the switching transistor M1 in accordance with an output signal Sq from the RS flip-flop circuit 9, thereby driving the switching transistor M1.

On the other hand, the slope voltage generation circuit 6 is composed of an inverter 11, a voltage/current conversion circuit 12, an offset diode 13, PMOS transistors 14 and 15, and a capacitor 16. Note that the switching transistor M1 constitutes a switching element; the diode D1 constitutes a rectifying element; and the resistors 2 and 3, the reference voltage generation circuit 4, and the error amplification circuit 5 constitute an error amplification circuit unit. Furthermore, the slope voltage generation circuit 6 constitutes a slope voltage generation circuit unit; the oscillation circuit 8 constitutes an oscillation circuit unit; and the PWM comparator 7, the RS flip-flop circuit 9, and the inverter 10 constitute a switching control circuit unit. Furthermore, the PWM comparator 7 constitutes a voltage comparison circuit; the RS flip-flop circuit 9 constitutes a control circuit; the voltage/current conversion circuit 12 constitutes a current supply; the PMOS transistor 14 constitutes a voltage supply circuit; and the PMOS transistor 15 constitutes a discharge circuit. Furthermore, in the switching regulator 1 shown in FIG. 2, the respective circuits other than the inductor L1, the diode D1, the capacitor C1, and the resistors 2 and 3 are integrated in a circuit.

The switching transistor M1 is connected between the input voltage Vin and the cathode of the diode D1, and the anode of the diode D1 is connected to ground potential. The inductor L1 is connected between the drain of the switching transistor M1 and the output terminal OUT, and the series circuit of the resistors 2 and 3 and the capacitor C1 are connected in parallel between the output terminal OUT and ground potential. The divided voltage Vfb serving as the voltage of the connection part between the resistors 2 and 3 is input to the non-inverting input terminal of the error amplification circuit 5, and the reference voltage Vref is input to the inverting input terminal of the error amplification circuit 5. Furthermore, the error voltage Ve from the error amplification circuit 5 is input to the non-inverting input terminal of the PWM comparator 7, and the slope voltage Vs is input to the inverting input terminal of the PWM comparator 7. The signal level of the output signal Sq of the RS flip-flop circuit 9 is inverted by the inverter 10 and input to the gate of the switching transistor M1.

In the slope voltage generation circuit 6, the PMOS transistor 14 is connected between the drain of the switching transistor M1 and the anode of the offset diode 13. The cathode of the offset diode 13 is connected to the inverting input terminal of the PWM comparator 7, and the voltage/current conversion circuit 12 is connected between the inverting input terminal of the PWM comparator 7 and ground potential. The voltage/current conversion circuit 12 has a control signal input terminal to which the input voltage Vin is input and is connected to the oscillation circuit 8. The voltage/current conversion circuit 12 feeds a current islope corresponding to the input voltage Vin and the oscillation frequency Fosc from the offset diode 13 to ground potential.

The connection part between the offset diode 13 and the voltage/current conversion circuit 12 serves as the output terminal of the slope voltage generation circuit 6, and the slope voltage Vs is output from the connection part. The inverter 11 inverts the signal level of the clock signal CLK and outputs the inverted clock signal CLK to the gate of the PMOS transistor 14. Furthermore, the PMOS transistor 15 and the capacitor 16 are connected in parallel between the input voltage Vin and the drain of the PMOS transistor 14, and the output signal Sq of the RS flip-flop circuit 9 is input to the gate of the PMOS transistor 15.

In such a configuration, when the error voltage Ve is smaller than or equal to the slope voltage Vs, the PWM comparator 7 outputs a low level signal, the RS flip-flop circuit 9 outputs a high level signal while the clock signal CLK becomes a high level, and the switching transistor M1 is turned on by the inverter 10 to establish an electrical connection. When the switching transistor M1 is turned on, power is supplied to the inductor L1, the smoothing capacitor C1, and the load 21. When the switching transistor M1 is turned off, the energies accumulated in the inductor L1 and the smoothing capacitor C1 are supplied to the load 21.

The error amplification circuit 5 amplifies a voltage difference between the divided voltage Vfb obtained by dividing the output voltage Vout and the predetermined reference voltage Vref and outputs the generated error voltage Ve to the non-inverting input terminal of the PWM comparator 7. The PWM comparator 7 compares the error voltage Ve with the slope voltage Vs from the slope voltage generation circuit 6. When the error voltage Ve exceeds the slope voltage Vs, the PWM comparator 7 resets the RS flip-flop circuit 9 to turn off the switching transistor M1. Therefore, the peak current value of the inductor current iL depends on the error voltage Ve.

In regulating the output voltage Vout, the PWM comparator 7 increases the error voltage Ve to reduce the output voltage Vout when the divided voltage Vfb is larger than the reference voltage Vref. Furthermore, the PWM comparator 7 reduces the error voltage Ve to increase the output voltage Vout when the divided voltage Vfb is smaller than the reference voltage Vref.

Figure 3:
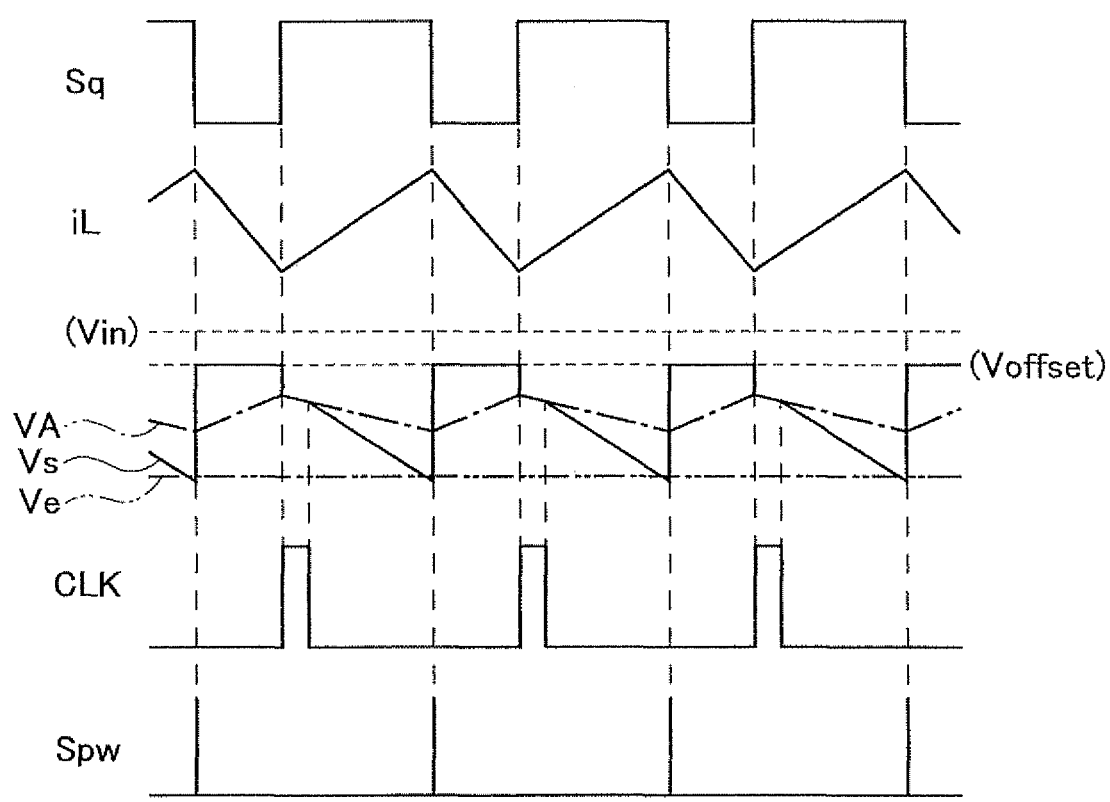
FIG. 3 is a timing chart showing waveform examples of respective parts shown in FIG. 2.

Next, FIG. 3 is a timing chart showing waveform examples of the respective parts shown in FIG. 2. Referring hereto FIG. 3, a description is made of operations of the slope voltage generation circuit 6 shown in FIG. 2.

The voltage/current conversion circuit 12 generates and outputs the current islope corresponding to the input voltage Vin and the oscillation frequency Fosc, where the current islope is obtained by "A×Vin×Fosc." Note that A represents a predetermined value. The offset voltage Voffset, which is added to the input voltage Vin by the offset diode 13, becomes the forward dropping voltage of the offset diode 13.

The input voltage is applied to one end of the capacitor 16. When the clock signal CLK becomes a high level and the PMOS transistor 14 is turned on, the drain voltage VA of the switching transistor M1 is applied to the other end of the capacitor 16 via the transistor 14. Therefore, a voltage difference occurs between voltages at corresponding ends of the capacitor 16, and the capacitor 16 is charged with the voltage difference. Assuming that the on-resistance of the switching transistor M1 is Ron and a current value at the valleys of the inductor current iL is iLvalley, the drain voltage VA of the switching transistor M1 when the switching transistor M1 is turned on is obtained by "VA=Vin−Ron×iLvalley."

When the PMOS transistor 14 is turned off to cut off an electrical connection, the electrical charge of the capacitor 16 is extracted by the voltage/current conversion circuit 12. Assuming that the capacity of the capacitor 16 is Cvs, the inclination of the voltage of the capacitor 16 is obtained by "−A×Vin×Fosc/Cvs."

Therefore, assuming that an elapsed time since the switching transistor M1 is turned on is t, the slope voltage Vs when the switching transistor M1 is turned on is obtained by the following formula (1).

$$Vs = Vin - Voffset - Ron \times iLvalley - A \times Vin \times Fosc/Cvs \times t \quad (1)$$

If it is desired that the inductance L of the inductor L1 be set to 2.2 µH, 4.7 µH, 10 µH, and 15 µH when the oscillation frequency Fosc is 2 MHz, 1 MHz, 500 kHz, and 300 kHz, respectively, the following relationship is established.

$$A/Cvs = Ron/\{500\ k(Hz) \times 10\ \mu(H)\} \quad (2)$$

Accordingly, the following formula (3) can be obtained by formula (1).

$$dVs/dt = -Ron \times Vin \times Fosc/\{500\ k(Hz) \times 10\ \mu(H)\} \quad (3)$$

Since the relationship "L=10 µ(H)×{500 k(Hz)/Fosc}" is established, formula (3) is transformed into the following formula (4).

$$dVs/dt = -Ron \times Vin/L \quad (4)$$

As described above, it is found that dVs/dt is transformed so as to correspond to the inductor L1 having the inductance L inversely proportional to the oscillation frequency Fosc, and the inclination dVs/dt of the slope voltage Vs varies in accordance with fluctuation in the input voltage Vin and the oscillation frequency Fosc.

On the other hand, when the output signal Sq of the RS flip-flop circuit 9 becomes a low level, the switching transistor M1 is turned off and the PMOS transistor 15 is turned on. Accordingly, the electrical charge stored in the capacitor 16 is completely discharged and reset.

In the above description, although formula (1) is obtained assuming that the on-resistance Ron is constant and the current islope generated by the voltage/current conversion circuit 12 serving as a current source is obtained by "islope=A×Vin×Fosc," the on-resistance Ron generally varies in accordance with the temperature of the switching transistor M1 and a gate voltage when the switching transistor M1 is turned on.

Therefore, when the relationship "islope=B×Ron×Vin×Fosc (where B represents a predetermined value)" is established so that the current islope includes fluctuation in the on-resistance Ron, formula (1) is transformed into the following formula (5).

$$Vs = Vin - Voffset - Ron \times iLvalley - B \times Ron \times Vin \times Fosc/Cvs \times t \quad (5)$$

The following formula (7) can be obtained by formula (5) as in the case of formula (4) when the relationship (6) is established.

$$B/Cvs = 1/\{500\ k(Hz) \times 10\ \mu(H)\} \quad (6)$$

$$dVs/dt = -Ron \times Vin/L \quad (7)$$

Since the inductance L varies in accordance with fluctuation in the oscillation frequency Fosc, it is found that the inclination dVs/dt of the slope voltage Vs varies in accordance with fluctuation in the input voltage Vin and the oscillation frequency Fosc.

Figure 4:
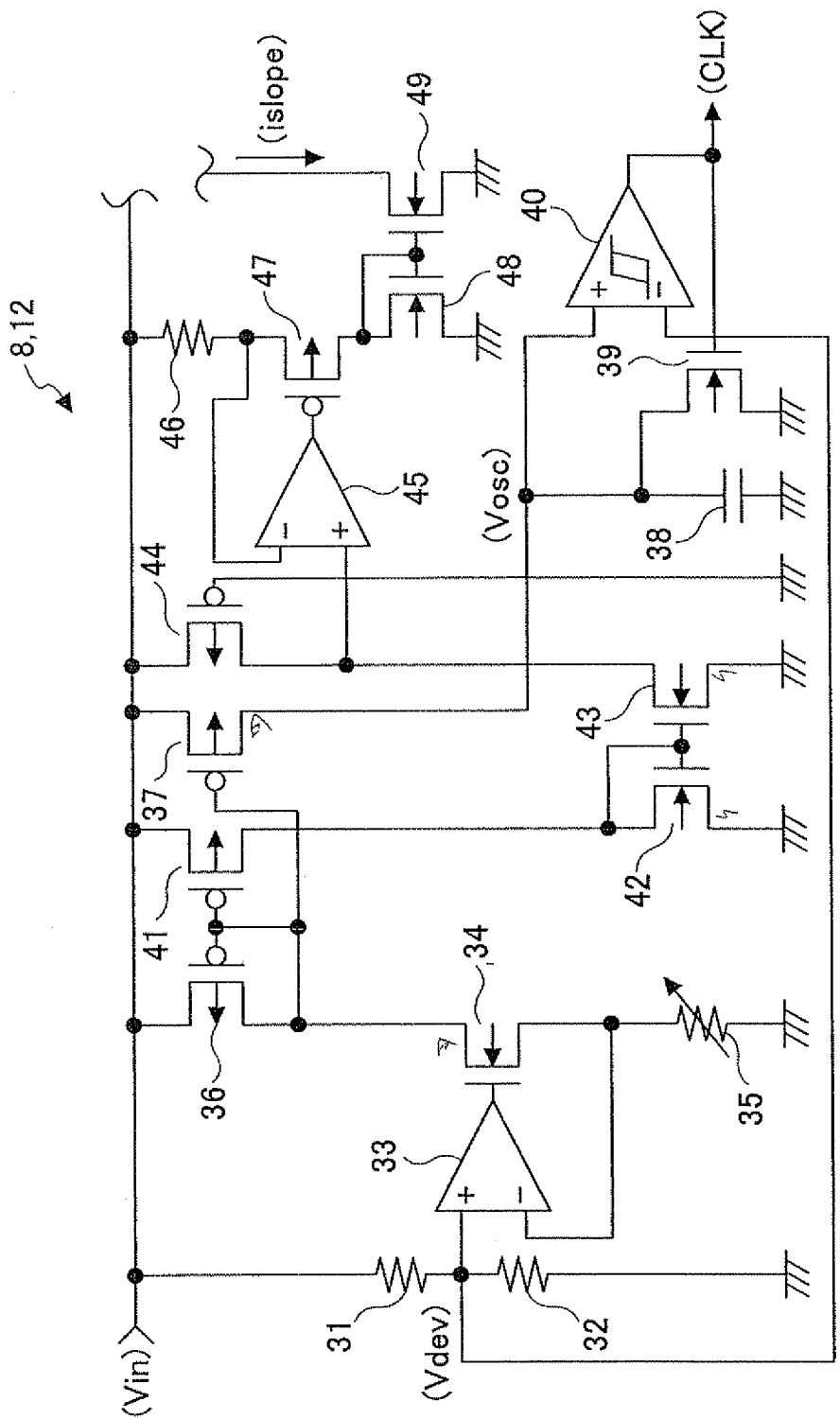
FIG. 4 is a circuit diagram showing a circuit example of an oscillation circuit 8 and a voltage/current conversion circuit 12 shown in FIG. 2.

Next, FIG. 4 is a circuit diagram showing a circuit example of the oscillation circuit 8 and the voltage/current conversion circuit 12 shown in FIG. 2.

In FIG. 4, the oscillation circuit 8 is composed of resistors 31 and 32, an error amplification circuit 33, NMOS transistors 34 and 39, a variable resistor 35, PMOS transistor 36 and 37, a capacitor 38, and a hysteresis comparator 40. Furthermore, the voltage/current conversion circuit 12 is composed of PMOS transistors 41, 44, and 47, NMOS transistors 42, 43, 48, and 49, an error amplification circuit 45, and a resistor 46. Note that in the following description, the resistance values of the resistors 31, 32, and 46 are represented as R31, R32, and R33, respectively, and the capacity of the capacitor 38 is represented as C38.

In the oscillation circuit 8, the resistors 31 and 32 are connected in series between the input voltage Vin and ground potential, and the connection part between the resistors 31 and 32 is connected to the non-inverting input terminal of the error amplification circuit 33 and the inverting input terminal of the hysteresis comparator 40. The output terminal of the error amplification circuit 33 is connected to the gate of the NMOS transistor 34, the variable resistor 35 is connected between the source of the NMOS transistor 34 and ground potential, and the connection part between the NMOS transistor 34 and the variable resistor 35 is connected to the inverting input terminal of the error amplification circuit 33.

The PMOS transistors 36 and 37 constitute a current mirror circuit, and the sources of the PMOS transistors 36 and 37 are connected to the input voltage Vin. The gates of the PMOS transistors 36 and 37 are connected to each other. The connection part between the gates of the PMOS transistors 36 and 37 is connected to the drain of the PMOS transistor 36. The drain of the PMOS transistor 36 is connected to the drain of the NMOS transistor 34, and the capacitor 38 is connected between the drain of the PMOS transistor 37 and ground potential. The connection part between the PMOS transistor 37 and the capacitor 38 is connected to the non-inverting input terminal of the hysteresis comparator 40, and the NMOS transistor 39 is connected parallel to the capacitor 38. The output terminal of the hysteresis comparator 40 is connected to the gate of the NMOS transistor 39. The clock signal CLK is output from the connection part between the output terminal of the hysteresis comparator 40 and the gate of the NMOS transistor 39.

Next, in the voltage/current conversion circuit 12, the PMOS transistors 41 and 36 constitute a current mirror circuit. The source of the PMOS transistor 41 is connected to the input voltage Vin. The gate of the PMOS transistor 41 is connected to the gate of the transistor 36. The connection part between the gate of the PMOS transistor 41 and the gate of the transistor 36 is connected to the drain of the PMOS transistor 36. Furthermore, the NMOS transistors 42 and 43 constitute a current mirror circuit. The sources of the NMOS transistors 42 and 43 are connected to ground potential. The gates of the NMOS transistors 42 and 43 are connected to each other. The connection part between the gates of the NMOS transistors 42 and 43 is connected to the drain of the NMOS transistor 42. The drain of the NMOS transistor 42 is connected to the drain of the PMOS transistor 41, and the PMOS transistor 44 is connected between the input voltage Vin and the drain of the NMOS transistor 43. The connection part between the PMOS transistor 44 and the NMOS transistor 43 is connected to the non-inverting input terminal of the error amplification circuit 45, and the gate of the PMOS transistor 44 is connected to ground potential.

The output terminal of the error amplification circuit 45 is connected to the gate of the PMOS transistor 47, and the inverting input terminal of the error amplification circuit 45 is connected to the source of the PMOS transistor 47. The resistor 46 is connected between the input voltage Vin and the source of the PMOS transistor 47, and the drain of the PMOS transistor 47 is connected to the drain of the NMOS transistor 48. The NMOS transistor 48 and 49 constitute a current mirror circuit. The sources of the NMOS transistor 48 and 49 are connected to ground potential. The gates of the NMOS transistors 48 and 49 are connected to each other. The connection part between the gates of the NMOS transistors 48 and 49 is connected to the drain of the NMOS transistor 48. The current fed to the drain of the NMOS transistor 49 is the current islope.

In such a configuration, the divided voltage "Vdev (=Vin× R31/(R31+R32))" obtained by dividing the input voltage Vin with the resistors 31 and 32 is input to the non-inverting input terminal of the error amplification circuit 33 and the inverting input terminal of the hysteresis comparator 40. The error amplification circuit 33 performs operations control on the NMOS transistor 34 so that the voltage of the connection part between the NMOS transistor 34 and the variable resistor 35 becomes equal to the divided voltage Vdev. Assuming that the resistance value of the variable resistor 35 is F/Fosc, the current fed to the variable resistor 35 is obtained by "{Vin× R31/(R31+R32)×Fosc/F}," the value of which becomes proportional to the oscillation frequency Fosc and the input voltage Vin.

The current fed through the NMOS transistor 34 is returned by the current mirror circuit of the PMOS transistors 36 and 37 and output to the capacitor 38 via the drain of the PMOS transistor 37. Simultaneously, the current fed through the NMOS transistor 34 is returned by the current mirror circuit of the PMOS transistors 36 and 41 and further returned by the current mirror circuit of the NMOS transistors 42 and 43, and then it is supplied to the PMOS transistor 44.

The hysteresis comparator 40 has a non-inverting input terminal to which the voltage Vosc of the connection part between the PMOS transistor 37, the capacitor 38, and the NMOS transistor 39 is input, and it also has an inverting input terminal to which the divided voltage Vdev is input. When the voltage Vosc is smaller than the divided voltage Vdev, a low level signal is output from the hysteresis comparator 40 and the NMOS transistor 39 is turned off to cut off an electrical connection. Therefore, the capacitor 38 is charged with the current obtained by "{Vin×R31/(R31+R32)×Fosc/F}" or a current proportional to the current involved.

Furthermore, when the voltage Vosc exceeds the divided voltage Vdev, a high level signal is output from the hysteresis comparator 40, the NMOS transistor 39 is turned on to immediately discharge the electrical charge of the capacitor 38, and the voltage Vosc becomes ground potential. Moreover, when the voltage Vosc becomes smaller than the divided voltage Vdev, the hysteresis comparator 40 outputs a low level signal again, and the NMOS transistor 39 is turned off to cut off an electrical connection. When such operations are repeatedly performed, the clock signal CLK of the oscillation frequency Fosc is generated. Since "{Vin×R31/(R31+R32)×Fosc/F/C38/Vdev}" and "Vdev=Vin×R31/(R31+R32)" are established, the oscillation frequency Fosc at this time is obtained by "Fosc=Fosc/F/C38." It should be arranged that the relationship "F×C38=1" is established.

The PMOS transistor 44 is manufactured in the same processing step as the switching transistor M1, and the assumed voltage when the switching transistor M1 is turned on, i.e., ground potential is input to the gate of the PMOS transistor 44. Here, it is assumed that the size of the PMOS transistor 44 is 1/n (where n is a positive integer) of the switching transistor M1 and the on-resistance of the PMOS transistor 44 is obtained by "n×Ron." The current obtained by "{Vin×R31/(R31+R32)×Fosc/F}" is fed to the PMOS transistor 44 by the current mirror circuit. Therefore, the voltage difference between both ends of the PMOS transistor 44 is obtained by "{n×Ron×(Vin×R31/(R31+R32)×Fosc/F)}."

Furthermore, since the error amplification circuit 45 performs operations control on the PMOS transistor 47 so that the voltage difference between both ends of the resistor 46 is the one obtained by "{n×Ron×(Vin×R31/(R31+R32)×Fosc/F)}," the current obtained by "{n×Ron×(Vin×R31/(R31+R32)×Fosc/F)}" is fed to the resistor 46. Accordingly, the currents of the drains of the NMOS transistors 48 and 49 constituting the current mirror circuit are obtained by "{n× Ron×(Vin×R31/(R31+R32)×Fosc/F)/R47}." Assuming that the relationship "B=n×R31/(R31+R32)/F/R47" is established, the current islope is obtained by the following formula (8).

$$islope = B \times Ron \times Vin \times Fosc \qquad (8)$$

Note that in the above description, the on-resistance of the switching transistor M1 is used for converting the current fed when the switching transistor M1 is turned on into a voltage. Alternatively, a sense resistor for detecting the output current of the switching transistor M1 may be connected in series to the inductor L1 so as to convert the current when the switching transistor M1 is turned on into a voltage. In this case, in the oscillation circuit 8 and the voltage/current conversion circuit 12 shown in FIG. 4, a resistor having the same temperature characteristics as the sense resistor may be used instead of the PMOS transistor 44. Furthermore, when fluctuation in the on-resistance of the switching transistor M1 is small, the current of the drain of the NMOS transistor 43 may be used as it is.

As described above, the current mode control switching regulator according to the first embodiment of the present invention varies the inclination of the slope voltage Vs in accordance with fluctuation in the input voltage Vin and the oscillation frequency Fosc, thereby making it possible to properly perform slope compensation under a wide input/output voltage range and a variable frequency with a simple circuit. As a result, it is possible to prevent the occurrence of subharmonic oscillation and suppress fluctuation in frequency characteristics.

Second Embodiment

Although the first embodiment describes the step-down switching regulator as an example, the present invention can also be applied to a step-up switching regulator, which is described as a second embodiment below.

Figure 5:
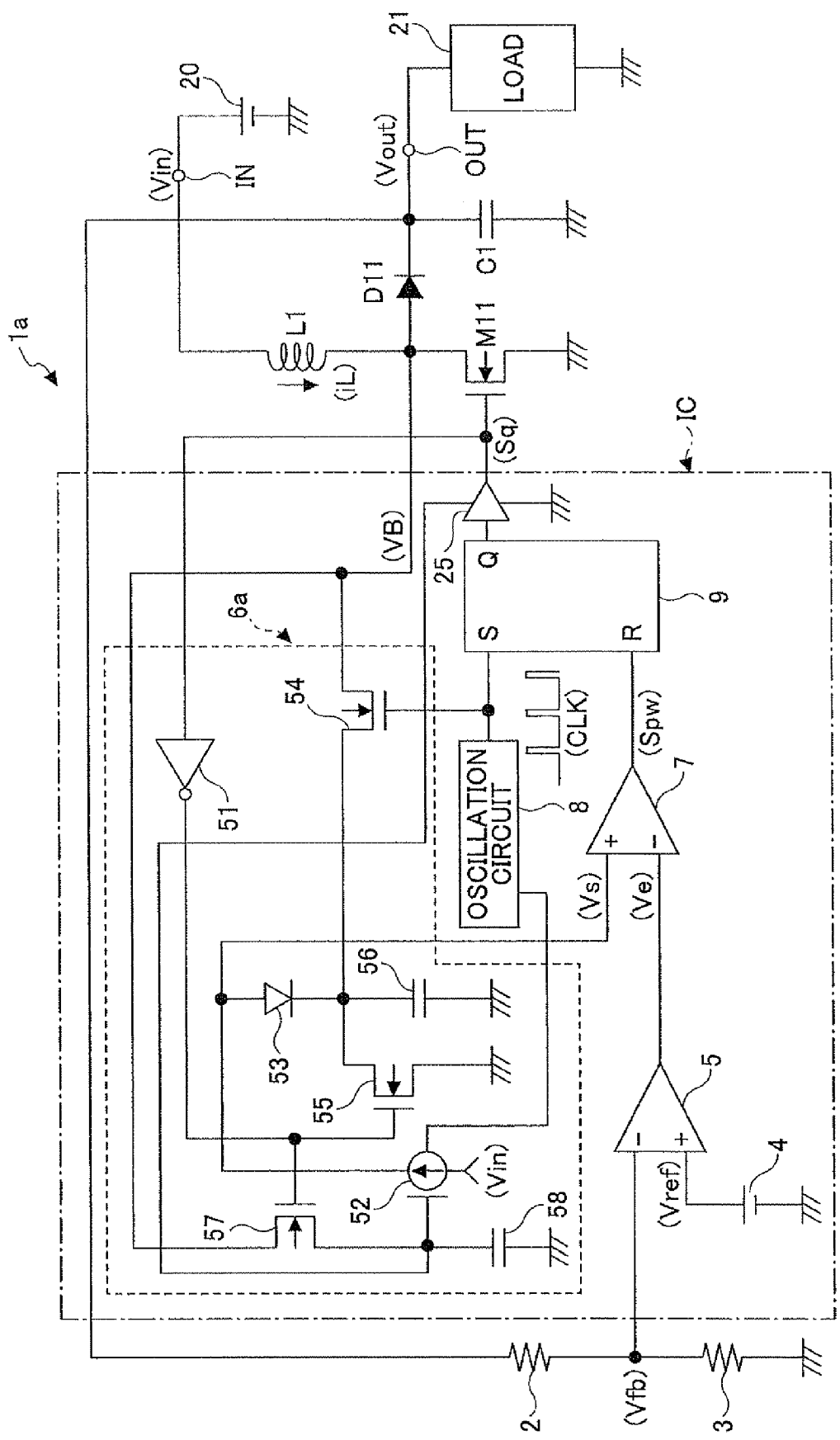
FIG. 5 is a circuit diagram showing a circuit example of a current-mode control switching regulator according to a second embodiment of the present invention.

FIG. 5 is a circuit diagram showing a circuit example of a current-mode control switching regulator according to the second embodiment of the present invention. Note that in FIG. 5, parts the same as or similar to those of FIG. 2 are denoted by the same reference numerals.

The switching regulator 1a shown in FIG. 5 constitutes the step-up switching regulator that converts an input voltage Vin input from a DC power supply 20 to an input terminal IN to a predetermined constant voltage and outputs the stepped input voltage from an output terminal OUT to a load 21 as an output voltage Vout.

The switching regulator 1a has a switching transistor M11 that is composed of a NMOS transistor; a rectifying diode D11; an inductor L1; a smoothing capacitor C1; and output voltage detecting resistors 2 and 3 that divide an output voltage Vout output from the output terminal OUT and generate and output a divided voltage Vfb. In addition, the switching regulator 1a has a reference voltage generation circuit 4 that generates and outputs a predetermined reference voltage Vref; an error amplification circuit 5 that compares the divided voltage Vfb with the reference voltage Vref, amplifies a voltage difference between the divided voltage Vfb and the reference voltage Vref, and generates and outputs an error voltage Ve; and a slope voltage generation circuit 6a that generates and outputs a slope voltage Vs.

Moreover, the switching regulator 1a has a PWM comparator 7, an oscillation circuit 8 with variable oscillation frequency, an RS flip-flop circuit 9, and a buffer 25. The PWM comparator 7 compares the error voltage Ve from the error amplification circuit 5 with the slope voltage Vs and generates and outputs a pulse signal Spw for performing PWM control having a pulse width corresponding to the error voltage Ve. The oscillation circuit 8 with variable oscillation frequency generates and outputs the clock signal CLK having a set oscillation frequency Fosc. The RS flip-flop circuit 9 has a set input terminal S to which the clock signal CLK from the oscillation circuit 8 is input and a reset input terminal R to which the pulse signal Spw from the PWM comparator 7 is input.

On the other hand, the slope voltage generation circuit 6a is composed of an inverter 51, a voltage/current conversion circuit 52, an offset diode 53, NMOS transistors 54, 55, and 57, and capacitors 56 and 58. Note that the switching transistor M11 constitutes a switching element, and the diode D11 constitutes a rectifying element. Furthermore, the slope voltage generation circuit 6a constitutes a slope voltage generation circuit unit, and the PWM comparator 7, the RS flip-flop circuit 9, and the buffer 25 constitute a switching control circuit unit. Furthermore, the voltage/current conversion circuit 52 constitutes a current supply, the NMOS transistor 54 constitutes a voltage supply circuit, and the NMOS transistor 55 constitutes a discharge circuit. Furthermore, in the switching regulator 1a shown in FIG. 5, the respective circuits other than the inductor L1, the diode D11, the capacitor C1, and the resistors 2 and 3 are integrated in a circuit.

The inductor L1 is connected between the input voltage Vin and the drain of the switching transistor M11. The anode of the diode D11 is connected to the drain of the switching transistor M11, and the cathode of the diode D11 is connected to the output terminal OUT. The series circuit of the resistors 2 and 3 and the capacitor C1 are connected in parallel between the output terminal OUT and ground potential. The divided voltage Vfb serving as the voltage of the connection part between the resistors 2 and 3 is input to the inverting input terminal of the error amplification circuit 5, and the reference voltage Vref is input to the non-inverting input terminal of the error amplification circuit 5. Furthermore, the error voltage Ve from the error amplification circuit 5 is input to the inverting input terminal of the PWM comparator 7, and the slope voltage Vs is input to the non-inverting input terminal of the PWM comparator 7. The output signal of the RS flip-flop circuit 9 is output via the buffer 25 as an output signal Sq. The output signal Sq is input to the gate of the switching transistor M11, and the signal level of the output signal Sq is inverted by the inverter 51 and input to the gates of the NMOS transistors 55 and 57.

In the slope voltage generation circuit 6a, the voltage/current conversion circuit 52, the offset diode 53, and the capacitor 56 are connected in series between the input voltage Vin and ground potential, and the NMOS transistor 55 is connected parallel to the capacitor 56. The NMOS transistor 54 is connected between the connection part between the cathode of the offset diode 53 and the capacitor 56 and the drain of the switching transistor M11, and the clock signal CLK is input to the gate of the NMOS transistor 54. Furthermore, the NMOS transistor 57 and the capacitor 58 are connected in series between the drain of the switching transistor M11 and ground potential. The control signal input terminal of the voltage/current conversion circuit 52 is connected to the connection part between the NMOS transistor 57 and the capacitor 58. Furthermore, the voltage/current conversion circuit 52 is connected to the oscillation circuit 8. The slope voltage Vs is output from the connection part between the voltage/current conversion circuit 52 and the anode of the offset diode 53 to the non-inverting input terminal of the PWM comparator 7.

In such a configuration, when the switching transistor M11 is turned on to establish an electrical connection, power is supplied from the DC power supply 20 to the inductor L1. When the switching transistor M11 is turned off to cut off the electrical connection, the energy accumulated in the inductor L1 is added to the input voltage Vin and output from the output terminal OUT. The RS flip-flop circuit 9 is set when the clock signal CLK becomes a high level and causes the output signal Sq to be a high level. Thus, the switching transistor M11 is turned on to establish the electrical connection. The error amplification circuit 5 outputs the error voltage Ve so that the divided voltage Vfb becomes equal to the reference voltage Vref. The PWM comparator 7 compares the slope voltage Vs with the error voltage Ve. When the slope voltage Vs exceeds the error voltage Ve, the PWM comparator 7 resets the RS flip-flop circuit 9 to turn off the switching transistor M11 and cut off the electrical connection.

Figure 6:
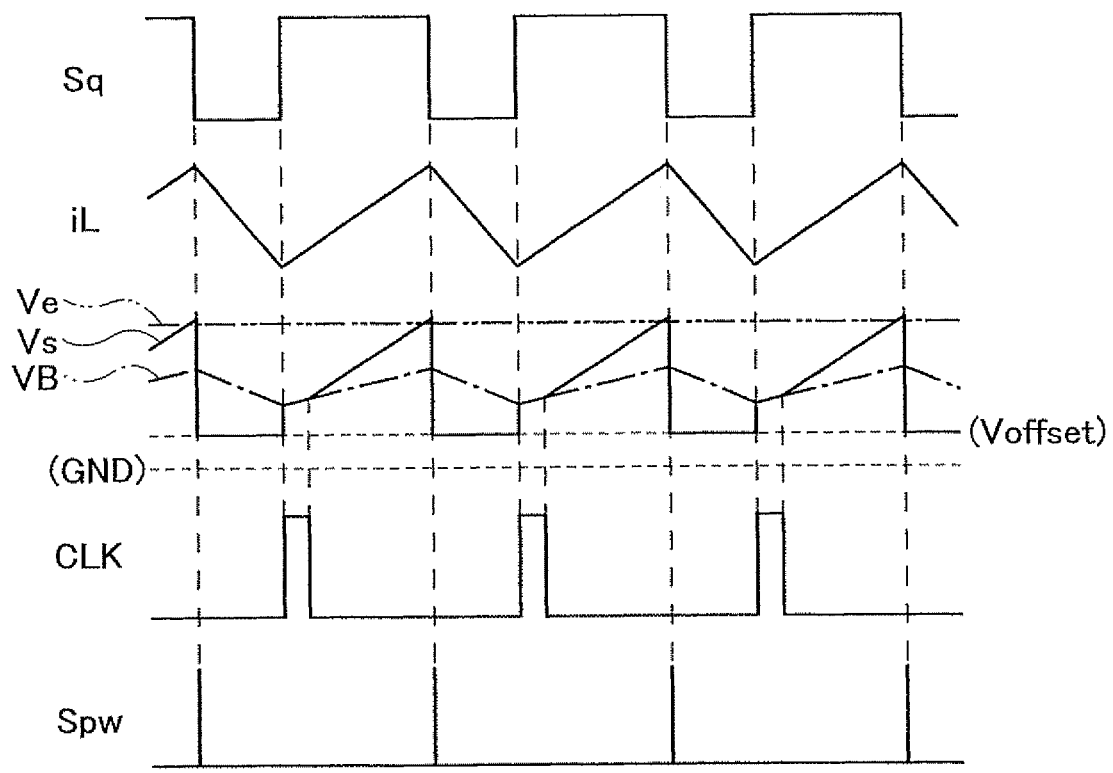
FIG. 6 is a timing chart showing waveform examples of respective parts shown in FIG. 5.

Next, FIG. 6 is a timing chart showing waveform examples of the respective parts shown in FIG. 5. Referring to FIG. 6, a description is made of the generation of the slope voltage Vs with the slope voltage generation circuit 6a.

Since the connection part between the NMOS transistor 57 and the capacitor 58 has the same voltage as the output voltage Vout, the voltage/current conversion circuit 52 generates and outputs the current islope corresponding to the output voltage Vout and the oscillation frequency Fosc, where the current islope is obtained by "D×Vout×Fosc." Note that D represents a predetermined value. The offset voltage Voffset, which is added by the offset diode 53, becomes the forward dropping voltage of the offset diode 53.

The output voltage Vout is the drain voltage VB of the switching transistor M11 when the switching transistor M11 is turned off. When the NMOS transistor 57 is turned on while the switching transistor M11 is turned off, the voltages at both ends of the capacitor 58 are held to the output voltage Vout. Thus, the relationship "islope=D×Vout×Fosc" is established. Furthermore, since the voltages serve as the power supply for the buffer 25, the gate voltage of the switching transistor M11 can be driven with a voltage higher than the input voltage Vin.

The NMOS transistor 54 samples the drain voltage VB of the switching transistor M11 in the capacitor 56 during the period in which the clock signal CLK from the oscillation circuit 8 is high-level. Assuming that the on-resistance of the switching transistor M11 is Ron, the drain voltage VB of the sampled switching transistor M11 is obtained by "VB=Ron×iLvalley." Note that iLvalley represents a current value between the valleys of the inductor current iL.

When the NMOS transistor 54 is turned off to cut off an electrical connection, the capacitor 56 is charged with the voltage/current conversion circuit 52 serving as a current supply. Assuming that the capacity value of the capacitor 56 is Cvs, the inclination of the voltage of the capacitor 56 is obtained by "D×Vout×Fosc/Cvs." Therefore, assuming that an elapsed time since the switching transistor M11 is turned on is t, the slope voltage Vs when the switching transistor M11 is turned on is obtained by the following formula (9).

$$Vs = Voffset + Ron \times iLvalley + D \times Vout \times Fosc/Cvs \times t \tag{9}$$

If it is desired that the inductance L of the inductor L1 be set to 2.2 μH, 4.7 μH, 10 μH, and 15 μH when the oscillation frequency Fosc is 2 MHz, 1 MHz, 500 kHz, and 300 kHz, respectively, the following relationship is established.

$$D/Cvs = Ron/\{500 \text{ k(Hz)} \times 10 \text{ μ(H)}\} \tag{10}$$

Accordingly, the following formula (11) can be obtained by formula (9).

$$dVs/dt = Ron \times Vout \times Fosc/\{500 \text{ k(Hz)} \times 10 \text{ μ(H)}\} \tag{11}$$

Since the relationship "L=10 μ(H)×{500 k(Hz)/Fosc}" is established, formula (11) is transformed into the following formula (12).

$$dVs/dt = Ron \times Vout/L \tag{12}$$

As described above, it is found that dVs/dt is transformed so as to correspond to the inductor L1 having the inductance L inversely proportional to the oscillation frequency Fosc, and the inclination dVs/dt of the slope voltage Vs varies in accordance with the fluctuation in the input voltage Vin and the oscillation frequency Fosc.

On the other hand, when the switching transistor M11 is turned off, the NMOS transistor 55 is turned on to discharge the electrical charge stored in the capacitor 56. Therefore, the voltage of the capacitor 56 is reset to ground potential.

In the above description, although formula (10) is obtained assuming that the on-resistance Ron is constant and the current islope generated by the voltage/current conversion circuit 52 serving as the current supply is obtained by "islope=D×Vout×Fosc," the on-resistance Ron generally varies in accordance with the temperature of the switching transistor M11 and a gate voltage when the switching transistor M11 is turned on.

Therefore, when the relationship "islope=E×Ron×Vout× Fosc (where E represents a predetermined value)" is established so that the current islope includes fluctuation in the on-resistance Ron, formula (9) is transformed into the following formula (13).

$$Vs = Voffset + Ron \times iLvalley + E \times Ron \times Vout \times Fosc/Cvs \times t \tag{13}$$

The following formula (15) can be obtained by formula (13) as in the case of formula (12) when the relationship (14) is established.

$$E/Cvs = 1/\{500 \text{ k(Hz)} \times 10 \text{ μ(H)}\} \tag{14}$$

$$dVs/dt = Ron \times Vout/L \tag{15}$$

Since the inductance L varies in accordance with fluctuation in the oscillation frequency Fosc, it is found that the inclination dVs/dt of the slope voltage Vs varies in accordance with fluctuation in the output voltage Vout and the oscillation frequency Fosc.

Figure 7:
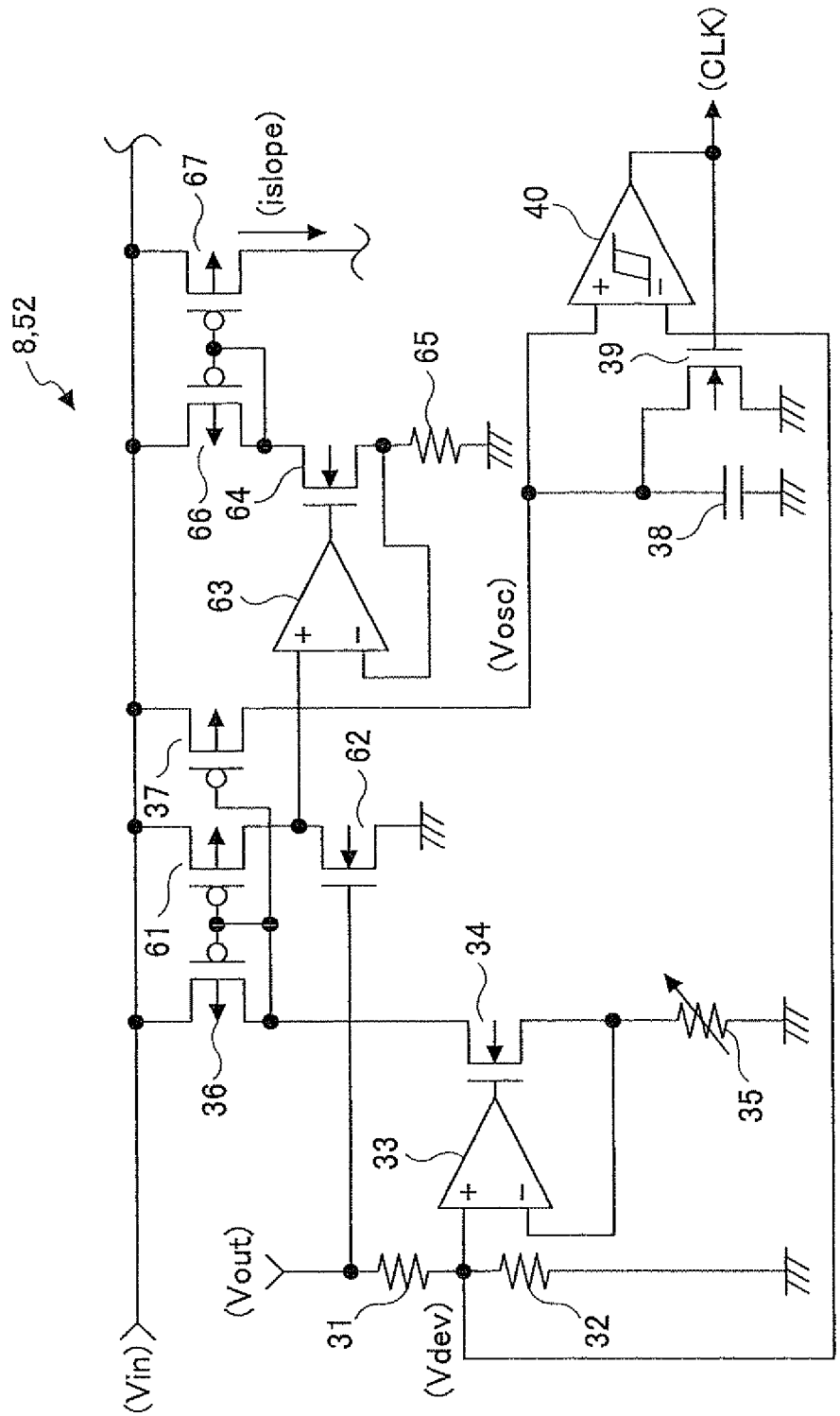
FIG. 7 is a circuit diagram showing a circuit example of the oscillation circuit 8 and the voltage/current conversion circuit 52 shown in FIG. 5.

Next, FIG. 7 is a circuit diagram showing a circuit example of the oscillation circuit 8 and the voltage/current conversion circuit 52 shown in FIG. 5. Note that in FIG. 7, parts the same as or similar to those of FIG. 4 are denoted by the same reference numerals.

The oscillation circuit 8 is composed of resistors 31 and 32, an error amplification circuit 33, NMOS transistors 34 and 39, a variable resistor 35, PMOS transistor 36 and 37, a capacitor 38, and a hysteresis comparator 40. Furthermore, the voltage/current conversion circuit 52 is composed of PMOS transistors 61, 66, and 67, NMOS transistors 62 and 64, an error amplification circuit 63, and a resistor 65. Note that in the following description, the resistance value of the resistor 65 is represented as R65.

The oscillation circuit 8 shown in FIG. 7 is different from that shown in FIG. 4 only in that the series circuit of the resistors 31 and 32 is connected between the output voltage Vout and ground potential.

In the voltage/current conversion circuit 52, the PMOS transistors 61 and 36 constitute a current mirror circuit. The source of the PMOS transistor 61 is connected to the input voltage Vin, and the gate of the PMOS transistor 61 is connected to the gate of the PMOS transistor 36. The connection part between the gate of the PMOS transistor 61 and the gate of the PMOS transistor 36 is connected to the drain of the PMOS transistor 36. The NMOS transistor 62 is connected between the drain of the PMOS transistor 61 and ground potential, and the output voltage Vout is input to the gate of the NMOS transistor 62. The connection part between the PMOS transistor 61 and the NMOS transistor 62 is connected to the non-inverting input terminal of the error amplification circuit 63.

The output terminal of the error amplification circuit 63 is connected to the gate of the NMOS transistor 64, and the inverting input terminal of the error amplification circuit 63 is connected to the source of the NMOS transistor 64. The resistor 65 is connected between the source of the NMOS transistor 64 and ground potential, the drain of the NMOS transistor 64 is connected to the drain of the PMOS transistor 66. The PMOS transistors 66 and 67 constitute a current mirror circuit. The sources of the PMOS transistors 66 and 67 are connected to the input voltage Vin. The gates of the PMOS transistors 66 and 67 are connected to each other. The connection part between the gates of the PMOS transistors 66 and 67 is connected to the drain of the PMOS transistor 66. The current output from the drain of the PMOS transistor 67 is the current islope.

In such a configuration, the divided voltage Vdev (=Vout× R31/(R31+R32)) obtained by dividing the output voltage Vout with the resistors 31 and 32 is input to the non-inverting input terminal of the error amplification circuit 33 and the inverting input terminal of the hysteresis comparator 40. The error amplification circuit 33 performs operations control on the NMOS transistor 34 so that the voltage of the connection part between the NMOS transistor 34 and the variable resistor 35 becomes equal to the divided voltage Vdev. Assuming that the resistance value of the variable resistor 35 is F/Fosc, the current fed to the variable resistor 35 is obtained by "{Vout× R31/(R31+R32)×Fosc/F}," the value of which becomes proportional to the oscillation frequency Fosc and the output voltage Vout.

The current fed through the NMOS transistor 34 is returned by the current mirror circuit of the PMOS transistors 36 and 37 and output to the capacitor 38 via the drain of the PMOS transistor 37. Simultaneously, the current fed through the NMOS transistor 34 is returned by the current mirror circuit of the PMOS transistors 36 and 61 and then supplied to the NMOS transistor 62.

The hysteresis comparator 40 has a non-inverting input terminal to which the voltage Vosc of the connection part between the PMOS transistor 37, the capacitor 38, and the NMOS transistor 39 is input, and it also has an inverting input terminal to which the divided voltage Vdev is input. When the voltage Vosc is smaller than the divided voltage Vdev, a low level signal is output from the hysteresis comparator 40 and the NMOS transistor 39 is turned off to cut off an electrical connection. Therefore, the capacitor 38 is charged with the current obtained by "{Vout×R31/(R31+R32)×Fosc/F}" or a current proportional to the current involved.

Furthermore, when the voltage Vosc exceeds the divided voltage Vdev, a high level signal is output from the hysteresis comparator 40, the NMOS transistor 39 is turned on to immediately discharge the electrical charge of the capacitor 38, and the voltage Vosc becomes ground potential. Moreover, when the voltage Vosc becomes smaller than the divided voltage Vdev, the hysteresis comparator 40 outputs a low level signal again, and the NMOS transistor 39 is turned off to cut off an electrical connection. When such operations are repeatedly performed, the clock signal CLK of the oscillation frequency Fosc is generated. Since "{Vout×R31/(R31+R32)×Fosc/F/ C38/Vdev}" and "Vdev=Vout×R31/(R31+R32)" are established, the oscillation frequency Fosc at this time is obtained by "Fosc=Fosc/F/C38." It should be arranged that the relationship "F×C38=1" is established.

The NMOS transistor 62 is manufactured in the same processing step as the switching transistor M11, and the assumed voltage when the switching transistor M11 is turned on is input to the gate of the NMOS transistor 62. Here, it is assumed that the size of the NMOS transistor 62 is 1/n of the switching transistor M11 and the on-resistance of the NMOS transistor 62 is obtained by "n×Ron." The current obtained by "{Vout×R31/(R31+R32)×Fosc/F}" is fed to the NMOS transistor 62 by the current mirror circuit. Therefore, the voltage difference between both ends of the NMOS transistor 62 is obtained by "{n×Ron×(Vout×R31/(R31+R32)×Fosc/F)}."

Furthermore, since the error amplification circuit 63 performs operations control on the NMOS transistor 64 so that the voltage difference between both ends of the resistor 65 is the one obtained by "{n×Ron×(Vout×R31/(R31+R32)×Fosc/ F)}," the current obtained by "{n×Ron×(Vout×R31/(R31+ R32)×Fosc/F)}" is fed to the resistor 65. Accordingly, the currents of the drains of the PMOS transistors 66 and 67 constituting the current mirror circuit are obtained by "{n× Ron×(Vout×R31/(R31+R32)×Fosc/F)/R65}." Assuming that the relationship "E=n×R31/(R31+R32)/F/R65," the current islope is obtained by the following formula (16).

$$islope = E \times Ron \times Vout \times Fosc \quad (16)$$

Note that in the above description, the on-resistance of the switching transistor M11 is used for converting the current fed when the switching transistor M11 is turned on into a voltage. Alternatively, a sense resistor for detecting the output current of the switching transistor M11 may be connected in series to the inductor L1 so as to convert the current when the switching transistor M11 is turned on into a voltage. In this case, in the oscillation circuit 8 and the voltage/current conversion circuit 52 shown in FIG. 7, a resistor having the same temperature characteristics as the sense resistor may be used instead of the NMOS transistor 62. Furthermore, when the fluctuation in the on-resistance of the switching transistor M11 is small, the current of the drain of the PMOS transistor 61 may be used as it is.

As described above, the current mode control switching regulator according to the second embodiment of the present invention varies the inclination of the slope voltage Vs in accordance with fluctuation in the output voltage Vout and the oscillation frequency Fosc, thereby making it possible to properly perform slope compensation under a wide input/ output voltage range and variable frequency with a simple circuit. As a result, it is possible to prevent the occurrence of subharmonic oscillation and suppress fluctuation in the frequency characteristics.

Figure 8:
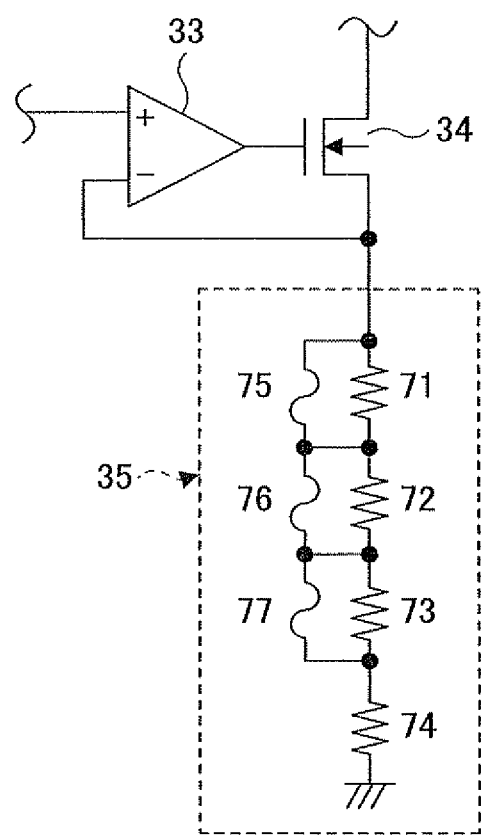
FIG. 8 is a circuit diagram showing a circuit example of a variable resistor 35 shown in FIGS. 4 and 7.
Figure 9:
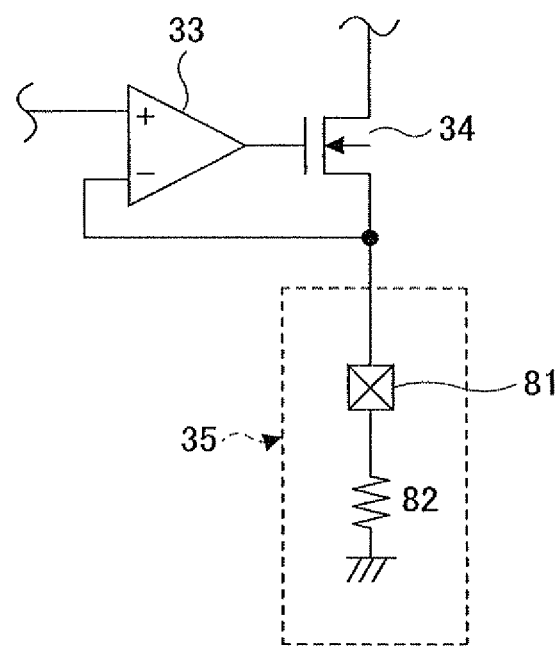
FIG. 9 is a circuit diagram showing another circuit example of the variable resistor 35 shown in FIGS. 4 and 7.
Figure 10:
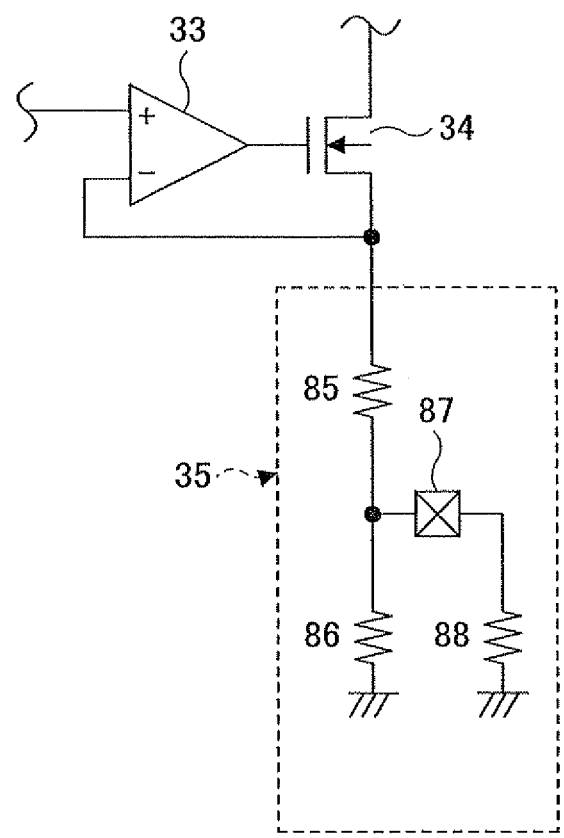
FIG. 10 is a circuit diagram showing still another circuit example of the variable resistor 35 shown in FIGS. 4 and 7.

Note that in the first and second embodiments, the variable resistor 35 may be configured as shown in FIGS. 8 through 10.

In FIG. 8, the variable resistor 35 is composed of resistors 71 through 73, an initial resistor 74, and trimming fuses 75 through 77. The resistors 71 through 73 and the initial resistor 74 are connected in series between the source of the NMOS transistor 34 and ground potential, and the trimming fuses 75 through 77 are connected parallel to the resistors 71 through 73, correspondingly.

The elements of the resistors 71 through 73, the initial resistor 74, and the trimming fuses 75 through 77 are provided in an IC. When the trimming fuses 75 through 77 are selectively disconnected by trimming, the resistance value of the variable resistor 35 can be adjusted. The trimming is thus performed, thereby making it possible to automatically adjust the slope voltage Vs so as to set frequencies having various patterns.

Note that FIG. 8 shows a case in which the three resistors and the trimming fuses connected parallel to the three resistors are provided in the variable resistor, but it is just an example. Alternatively, one or more resistors and trimming fuses connected parallel to the one or more resistors are only required to be provided in the variable resistor.

Next, in FIG. 9, the variable resistor 35 is composed of an external resistor 82 and a pad 81 serving as the connection point between the inside and the outside of an IC. When the external resistor 82 is changed, the resistance value of the variable resistor 35 can be varied. The user who uses the IC can freely change frequencies by changing the external resistor.

Next, in FIG. 10, the variable resistor 35 is composed of a pad 87 serving as the connection point between the inside and outside of an IC and resistors 85, 86, and 88. When the resistor 88 becomes 0Ω (i.e., the pad 87 is grounded), the resistance value of the variable resistor 35 becomes equal to that of the resistor 85. Furthermore, when the resistor 88 becomes ∞Ω (i.e., the pad 87 is in a released state), the resistance value of the variable resistor 35 becomes equal to the sum of the resistance values of the resistors 85 and 86. When the pad 87 becomes 0Ω (i.e., it is in a released state), it is not necessary to add external parts. Therefore, the frequency caused by the resistance value of the variable resistor 35 when the pad 87 is grounded (or it is in a released state) is set to the most frequently-used one, thereby making it possible to reduce the number of times that the user adds external parts. Furthermore, since the resistors 85 and 86 are provided inside the IC, the resistance values of the resistors 85 and 86 may be varied by trimming.

Moreover, the first and second embodiments describe the asynchronous rectification switching regulator as an example. However, the same effects can be achieved even with a synchronous rectification switching regulator using a synchronous rectification transistor that switches in an opposite phase relationship with the switching transistor instead of the rectifying diode.

According to the current-mode control switching regulator and the operations control method thereof, the inclination of a slope voltage used for generating a pulse signal for performing switching control on a switching element is varied in accordance with an input voltage and an oscillation frequency when the current-mode control switching regulator is of a step-down type, and it is varied in accordance with an output voltage and an oscillation frequency when the current-mode control switching regulator is of a step-up type. Therefore, the switching regulator with variable oscillation frequency and a relatively small fluctuation in input/output voltage can change the inclination of a slope voltage in accordance with an oscillation frequency. Furthermore, the step-down switching regulator with variable oscillation frequency and a relatively large fluctuation in input/output voltage can change the inclination of a slope voltage in accordance with an input voltage and an oscillation frequency. Furthermore, the step-up switching regulator with variable oscillation frequency and a relatively large fluctuation in input/output voltage can change the inclination of a slope voltage in accordance with an output voltage and an oscillation frequency. Thus, these switching regulators can prevent subharmonic oscillation in a wide input/output voltage range and a wide variable frequency range with a simple circuit and suppress the fluctuation in frequency characteristics.

The present application is based on Japanese Priority Application No. 2008-125715 filed on May 13, 2008, with the Japan Patent Office, the entire contents of which are hereby incorporated by reference.

The invention claimed is:

1. A current-mode control switching regulator that steps down an input voltage input to an input terminal to a predetermined constant voltage and outputs the stepped input voltage from an output terminal as an output voltage, the current-mode control switching regulator comprising:
   a switching element that performs a switching operation in accordance with an input control signal;
   an inductor that is charged with the input voltage by the switching operation of the switching element;
   a rectifying element that discharges the inductor;
   an error amplification circuit unit that amplifies a voltage difference between a divided voltage obtained by dividing the output voltage at a predetermined ratio and a predetermined reference voltage;
   an oscillation circuit unit with variable oscillation frequency that generates and outputs a clock signal having a set oscillation frequency;
   a slope voltage generation circuit unit that generates and outputs a slope voltage having an inclination corresponding to the input voltage and the oscillation frequency; and
   a switching control circuit unit that compares an output voltage from the error amplification circuit unit with the slope voltage, generates a pulse signal of a duty cycle corresponding to a comparison result using the clock signal, and performs switching control on the switching element in accordance with the pulse signal.

2. The current-mode control switching regulator according to claim 1, wherein,
   as the input voltage and the oscillation frequency are larger, the slope voltage generation circuit unit increases the inclination to generate the slope voltage so that the inclination of the slope voltage becomes one-half or more of the inclination of a change amount of a current fed to the inductor when the switching element is turned off to cut off an electrical connection.

3. The current-mode control switching regulator according to claim 2, wherein the slope voltage generation circuit unit has:
   a capacitor having one end connected to the input voltage;
   an offset diode having an anode connected to the other end of the capacitor;
   a current supply that is connected between a cathode of the offset diode and ground potential and feeds a current corresponding to the input voltage and the oscillation frequency;
   a voltage supply circuit that applies a voltage of an output terminal of the switching element to the other end of the capacitor for a predetermined time after the switching element is turned on to establish the electrical connection; and
   a discharge circuit that discharges an electrical charge stored in the capacitor when the switching element is turned off to cut off the electrical connection, and
   wherein the slope voltage generation circuit unit outputs the slope voltage from a connection part between the offset diode and the current supply.

4. The current-mode control switching regulator according to claim 3, wherein the switching control circuit unit has:
   a voltage comparison circuit that compares the output voltage from the error amplification circuit unit with the slope voltage and generates and outputs the pulse signal of the duty cycle corresponding to the comparison result; and
   a control circuit to which the clock signal from the oscillation circuit unit for turning on the switching element and the pulse signal from the voltage comparison circuit for turning off the switching element are input and which performs the switching control on the switching element in accordance with the clock signal and the pulse signal, and wherein the voltage supply circuit applies the voltage of the output terminal of the switching element to the other end of the capacitor in accordance with the clock signal from the oscillation circuit unit.

5. The current-mode control switching regulator according to claim 4, wherein
the control circuit is configured by an RS flip-flop circuit to which the clock signal is input from the oscillation circuit unit as a set signal and the pulse signal is input from the voltage comparison circuit as a reset signal.

6. A current-mode control switching regulator that steps up an input voltage input to an input terminal to a predetermined constant voltage and outputs the stepped input voltage from an output terminal as an output voltage, the current-mode control switching regulator comprising:
a switching element that performs a switching operation in accordance with an input control signal;
an inductor that is charged with the input voltage by the switching operation of the switching element;
a rectifying element that discharges the inductor;
an error amplification circuit unit that amplifies a voltage difference between a divided voltage obtained by dividing the output voltage at a predetermined ratio and a predetermined reference voltage;
an oscillation circuit unit with variable oscillation frequency that generates and outputs a clock signal having a set oscillation frequency;
a slope voltage generation circuit unit that generates and outputs a slope voltage having an inclination corresponding to the output voltage and the oscillation frequency; and
a switching control circuit unit that compares an output voltage from the error amplification circuit unit with the slope voltage, generates a pulse signal of a duty cycle corresponding to a comparison result using the clock signal, and performs switching control on the switching element in accordance with the pulse signal.

7. The current-mode control switching regulator according to claim 6, wherein,
as the output voltage and the oscillation frequency are larger, the slope voltage generation circuit unit increases the inclination to generate the slope voltage so that the inclination of the slope voltage becomes one-half or more of the inclination of a change amount of a current fed to the inductor when the switching element is turned off to cut off an electrical connection.

8. The current-mode control switching regulator according to claim 7, wherein the slope voltage generation circuit unit has:
a capacitor having one end connected to ground potential;
an offset diode having a cathode connected to the other end of the capacitor;
a current supply that is connected between the input voltage and an anode of the offset diode and feeds a current corresponding to the output voltage and the oscillation frequency;
a voltage supply circuit that applies a voltage of a connection part between the inductor and the switching element to the other end of the capacitor for a predetermined time after the switching element is turned on to establish the electrical connection; and
a discharge circuit that discharges an electrical charge stored in the capacitor when the switching element is turned off to cut off the electrical connection, and wherein the slope voltage generation circuit unit outputs the slope voltage from a connection part between the current supply and the offset diode.

9. The current-mode control switching regulator according to claim 8, wherein the switching control circuit unit has:
a voltage comparison circuit that compares the output voltage from the error amplification circuit unit with the slope voltage and generates and outputs the pulse signal of the duty cycle corresponding to the comparison result; and
a control circuit to which the clock signal from the oscillation circuit unit for turning on the switching element and the pulse signal from the voltage comparison circuit for turning off the switching element are input and which performs the switching control on the switching element in accordance with the clock signal and the pulse signal, and wherein the voltage supply circuit applies the voltage of a connection part between the inductor and the switching element to the other end of the capacitor in accordance with the clock signal from the oscillation circuit unit.

10. The current-mode control switching regulator according to claim 9, wherein
the control circuit is configured by an RS flip-flop circuit to which the clock signal is input from the oscillation circuit unit as a set signal and the pulse signal is input from the voltage comparison circuit as a reset signal.

11. The current-mode control switching regulator according to claim 1, wherein
the error amplification circuit unit, the oscillation circuit unit, the slope voltage generation circuit unit, and the switching control circuit unit are integrated in an IC.

12. An operations control method of a current-mode control switching regulator having a switching element that performs a switching operation in accordance with an input control signal; an inductor that is charged with an input voltage input to an input terminal by the switching operation of the switching element; a rectifying element that discharges the inductor; and an oscillation circuit unit with variable oscillation frequency that generates and outputs a clock signal having a set oscillation frequency, the current-mode control switching regulator performing switching control on the switching element in accordance with a pulse signal generated using the clock signal so that an output voltage from an output terminal becomes a predetermined constant voltage and stepping down the input voltage input to the input terminal to a predetermined constant voltage and outputting the stepped input voltage from the output terminal as the output voltage, the operations control method comprising:
varying an inclination of a slope voltage used for generating the pulse signal to perform the switching control on the switching element in accordance with the input voltage and the oscillation frequency.

13. The operations control method of the current-mode control switching regulator according to claim 12, the operations control method further comprising:
dividing the output voltage from the output terminal at a predetermined ratio;
amplifying a voltage difference between a divided voltage obtained by dividing the output voltage and a predetermined reference voltage;
generating a slope voltage having an inclination corresponding to the input voltage and the oscillation frequency;

comparing a voltage obtained by amplifying the voltage difference with the slope voltage to generate a pulse signal of a duty cycle corresponding to a comparison result; and performing switching control on the switching element in accordance with the pulse signal.

14. The operations control method of the current-mode control switching regulator according to claim 12, wherein, as the input voltage and the oscillation frequency are larger, the inclination is increased to generate the slope voltage so that the inclination of the slope voltage becomes one-half or more of the inclination of a change amount of a current fed to the inductor when the switching element is turned off to cut off an electrical connection.

15. The operations control method according to claim 12, further comprising:

providing a slope voltage generation circuit unit in the current-mode control switching regulator, to generate and output the slope voltage, wherein the inclination of the slope voltage generated by the slope voltage generation circuit unit varies in accordance with the oscillation frequency of the clock signal generated by the oscillation circuit having the variable oscillation frequency and varies in accordance with the input voltage.

16. The current-mode control switching regulator according to claim 6, wherein the inclination of the slope voltage generated by the slope voltage generation circuit unit varies in accordance with the oscillation frequency of the clock signal generated by the oscillation circuit having the variable oscillation frequency and varies in accordance with the output voltage.

17. The current-mode control switching regulator according to claim 1, wherein the inclination of the slope voltage generated by the slope voltage generation circuit unit varies in accordance with the oscillation frequency of the clock signal generated by the oscillation circuit having the variable oscillation frequency and varies in accordance with the input voltage.

* * * * *